(12) United States Patent
Egashira et al.

(10) Patent No.: US 11,722,029 B2
(45) Date of Patent: Aug. 8, 2023

(54) ROTARY ELECTRIC MACHINE

(71) Applicant: Mitsubishi Electric Corporation, Tokyo (JP)

(72) Inventors: Kohei Egashira, Tokyo (JP); Kazuya Hasegawa, Tokyo (JP); Tatsuro Hino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 17/037,912

(22) Filed: Sep. 30, 2020

(65) Prior Publication Data
US 2021/0184532 A1 Jun. 17, 2021

(30) Foreign Application Priority Data
Dec. 13, 2019 (JP) .................... 2019-225042

(51) Int. Cl.
*H02K 3/50* (2006.01)
*H02K 3/24* (2006.01)
(Continued)

(52) U.S. Cl.
CPC .................. *H02K 3/50* (2013.01); *H02K 3/24* (2013.01); *H02K 9/19* (2013.01); *H02K 11/25* (2016.01); *H02K 2203/09* (2013.01)

(58) Field of Classification Search
CPC ........................ H02K 9/19; H02K 2203/09
See application file for complete search history.

(56) References Cited

U.S. PATENT DOCUMENTS

2009/0322167 A1* 12/2009 Ishizuka ............. H02K 9/19
310/54
2014/0354095 A1 12/2014 Ishikawa et al.
(Continued)

FOREIGN PATENT DOCUMENTS

JP 2015008587 A 1/2015
JP 5770074 B2 8/2015
(Continued)

OTHER PUBLICATIONS

Machine translation of JP 2019110676 A (Year: 2019).*
Communication dated Feb. 16, 2021, from the Japanese Patent Office in Application No. 2019-225042.

*Primary Examiner* — Ahmed Elnakib
*Assistant Examiner* — Minki Chang
(74) *Attorney, Agent, or Firm* — Sughrue Mion, PLLC; Richard C. Turner (57) ABSTRACT

To provide a rotary electric machine which is improved in cooling performance. The rotary electric machine includes a rotor; and a stator which, being disposed opposite the rotor, has a stator core having a plurality of slots therein and a stator winding wound in the plurality of slots, wherein the stator has a plurality of coil ends which are formed protruding from an axial end face of the stator core and between adjacent ones of which is provided a radial clearance passing through from the inner diameter side to the outer diameter side, and wherein the stator includes a bus bar which, being disposed on the inner diameter side of the plurality of coil ends so as to occlude the clearances between the plurality of coil ends, guides a refrigerant, which is supplied from the radial direction of the stator, to the plurality of coil ends.

19 Claims, 12 Drawing Sheets

(51) Int. Cl.
*H02K 11/25* (2016.01)
*H02K 9/19* (2006.01)

(56) References Cited

U.S. PATENT DOCUMENTS

| | | | | |
|---|---|---|---|---|
| 2014/0375154 | A1* | 12/2014 | Sugiura | H02K 3/24 |
| | | | | 310/71 |
| 2016/0020658 | A1* | 1/2016 | Tamura | H02K 9/19 |
| | | | | 310/71 |
| 2019/0305639 | A1* | 10/2019 | Seki | H02K 9/00 |

FOREIGN PATENT DOCUMENTS

| | | | |
|---|---|---|---|
| JP | 2019110676 A | * | 7/2019 |
| JP | 2019110676 A | | 7/2019 |
| JP | 2019170082 A | | 10/2019 |

\* cited by examiner

ROTARY ELECTRIC MACHINE

BACKGROUND OF THE INVENTION

Field of the Invention

The present application relates to the field of a rotary electric machine.

Description of the Related Art

In recent years, a reduction in size, an increase in power, and an increase in efficiency have been required for a rotary electric machine such as an electric motor or an electric generator. In order to meet these requirements, particularly, an in-vehicle motor adopts a distributed winding which uses substantially rectangular cross-section coils. A distributed winding stator, as it has a smooth distribution of rotating fields, is characterized by low noise, as compared with a concentrated winding stator. Also, the use of substantially rectangular cross-section coils improves the space factor of the coils, and has the effect of an increase in power, as compared with when configuring a winding by bundling round wires. On the other hand, an improvement in cooling performance is required in the course of the trend toward a reduction in size and an increase in power.

As a solution to these problems, for example, a stator winding described in PTL 1 shows a structure in which coil turn portions, each folded back at the top portion of a coil end, are formed in a U-shape and are radially disposed so as for their lateral faces to face the center, and empty spaces passing through from the inner circumference side to the outer circumference side are each provided between a coil turn portion and an adjacent coil turn portion at the top of another coil end. By adopting this kind of structure, a refrigerant passes through the empty spaces between the coil end portions, thereby leading to an improvement in cooling performance.

[PTL 1] Japanese Patent No. 5,770,074

The rotary electric machine disclosed in PTL 1, however, has a problem in that the refrigerant passes through between the coil ends, so that only a slight amount of the refrigerant comes into contact with coils, resulting in a deficiency in cooling performance.

SUMMARY OF THE INVENTION

The present application has been made to solve the above problem, and an object of the present application is to provide a rotary electric machine which is improved in cooling performance.

A rotary electric machine disclosed in the present application includes a rotor; and a stator which, being disposed opposite the rotor, has a stator core having a plurality of slots therein and a stator winding wound in the plurality of slots. In the rotary electric machine, the stator has a plurality of coil ends which are formed protruding from an axial end face of the stator core and between adjacent ones of which is provided a radial clearance passing through from the inner diameter side to the outer diameter side. The stator also includes a bus bar which, being disposed on the inner diameter side of the plurality of coil ends so as to occlude the clearances between the plurality of coil ends, guides a refrigerant, which is supplied from the radial direction of the stator, to the plurality of coil ends.

According to the rotary electric machine disclosed in the present application, it is possible to obtain the rotary electric machine which is improved in cooling performance.

DETAILED DESCRIPTION OF THE PREFERRED EMBODIMENTS

First Embodiment

Hereinafter, a description will be given, based on the drawings, of the first embodiment. In the individual drawings, identical signs represent identical or equivalent portions.

Figure 1:
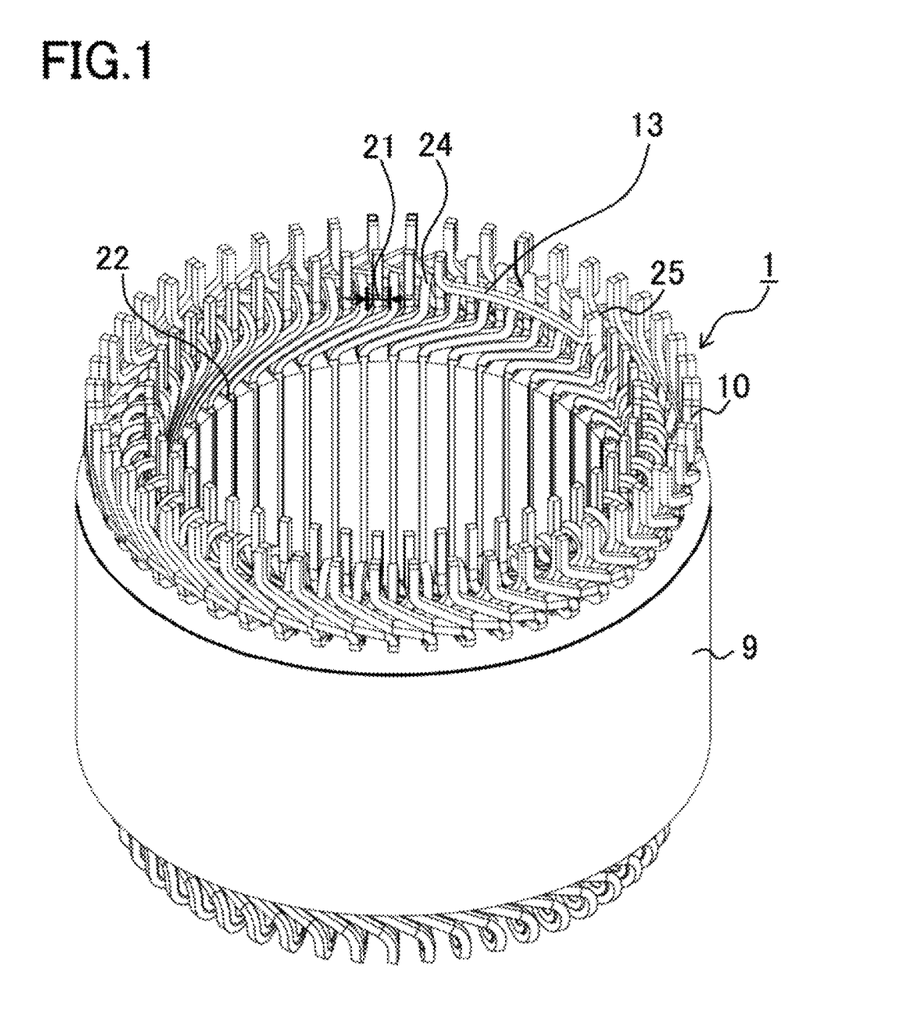
FIG. 1 is a perspective view showing a stator of a rotary electric machine according to the first embodiment.

FIG. 1 is a perspective view showing a stator of a rotary electric machine according to the first embodiment. As shown in FIG. 1, a stator 1 includes an annular stator core 9, a stator winding 10 wound on the stator core 9, and ground insulation paper (not shown) fixed in slots 22.

The stator core 9 includes therein the circumferentially arranged slots 22. The stator winding 10 is wound in the plurality of slots 22. A plurality of coil ends 24 are formed protruding from an axial end face of the stator core 9. Radial clearances 21, which pass through from the inner diameter side to the outer diameter side of the coil ends 24, are each provided between adjacent ones of the plurality of coil ends 24. A bus bar 13 is disposed on the inner diameter side of a plurality of ones of the coil ends 24. The bus bar 13 is provided so as to occlude the clearances 21, each between adjacent ones of the plurality of the coil ends 24. Also, the bus bar 13 electrically connects terminal wires 25 together.

Figure 2:
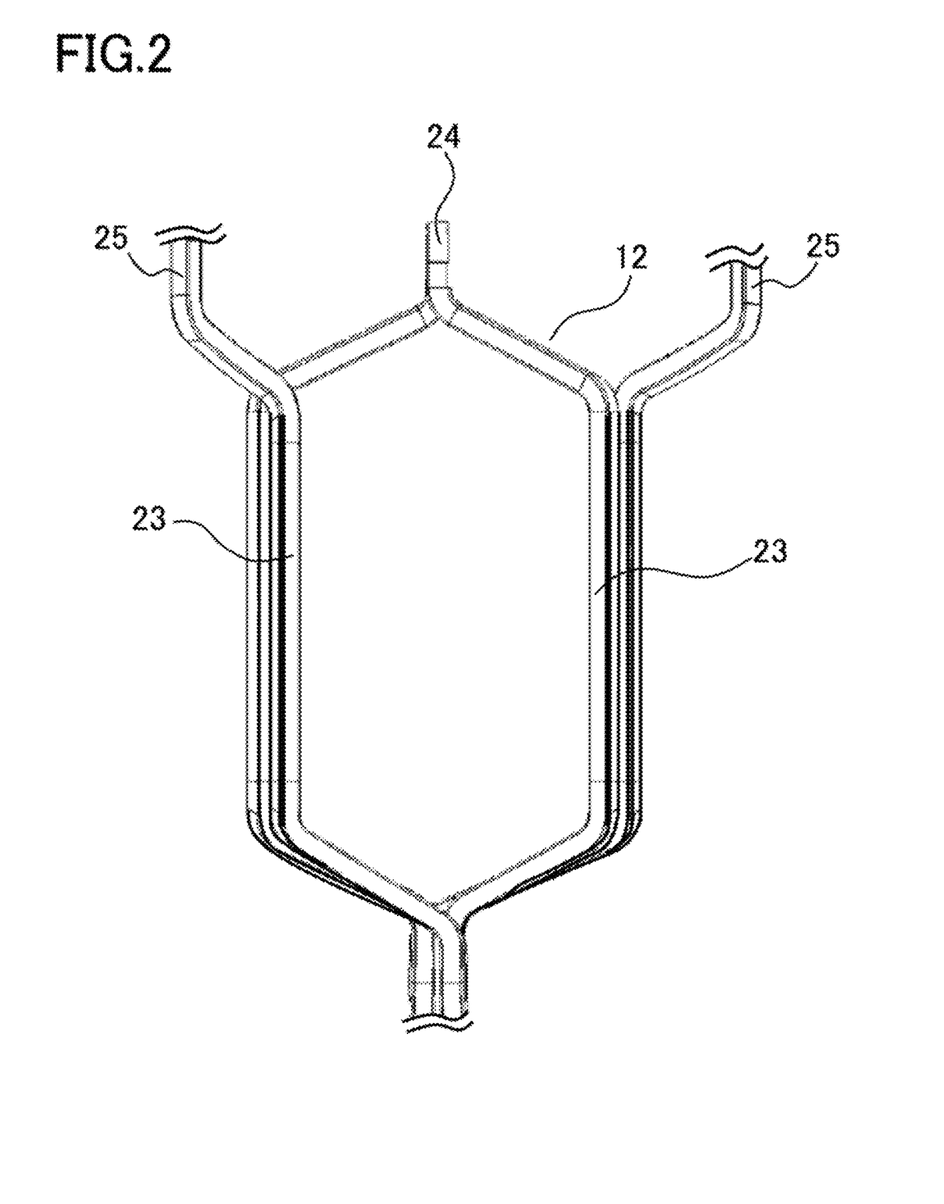
FIG. 2 is a front view showing a unit coil of the rotary electric machine according to the first embodiment.

FIG. 2 is a front view showing a unit coil of the rotary electric machine according to the first embodiment. A unit coil 12 is an annular coil, and the stator winding 10 includes a plurality of the unit coils 12. The unit coils 12 each have a coil slot portion 23 to be fixed in the slot 22 of the stator core 9, the coil end 24 which protrudes from the slot 22 of the stator core 9 and is connected to another coil end 24 protruding from a circumferentially different slot 22, and the terminal wire 25 which, axially protruding from the slot 22 of the stator core 9, is for connecting with another unit coil 12 of the stator winding 10.

Also, the stator winding 10 has at least one bus bar 13 which electrically connects the terminal wires 25 of a plurality of ones of the unit coils 12 together, and the unit coils 12 and the bus bar 13 configure the stator winding 10. The stator winding 10 and the bus bar 13 are different parts of the same material, for example, a metal containing copper.

Figure 3A:
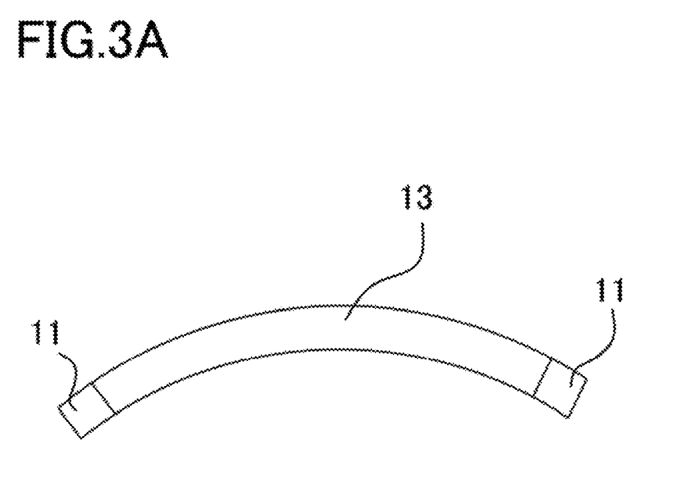
FIG. 3A is a top view of a bus bar of the rotary electric machine according to the first embodiment.
Figure 3B:
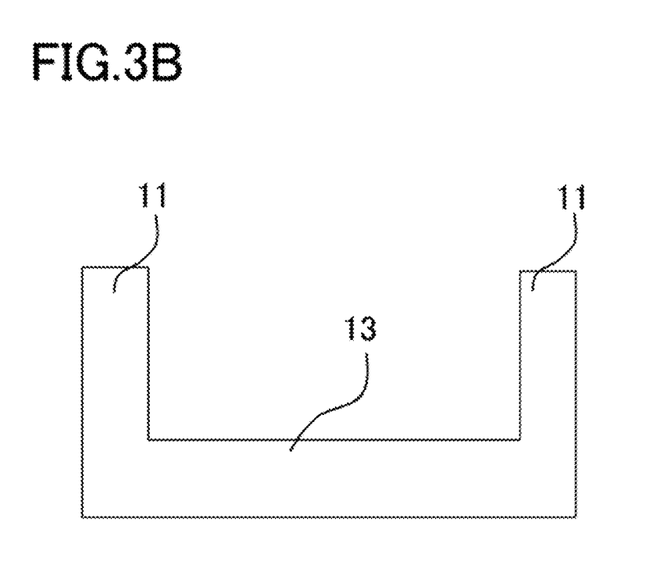
FIG. 3B is a side view of the bus bar in FIG. 3A.
Figure 4:
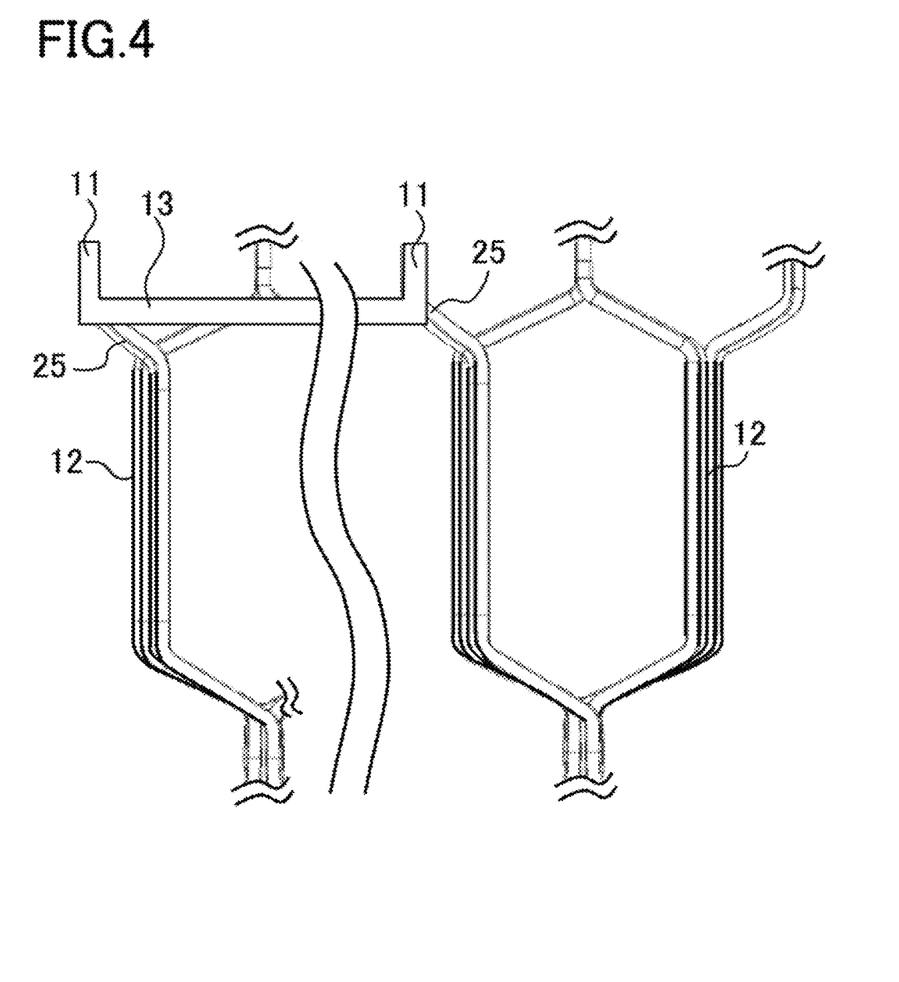
FIG. 4 is a diagram showing an example of connection of the bus bar of the rotary electric machine according to the first embodiment.

FIG. 3A is a top view of the bus bar of the rotary electric machine according to the first embodiment. Also, FIG. 3B is a side view of the bus bar in FIG. 3A. Furthermore, FIG. 4 is a diagram showing an example of connection of the bus bar of the rotary electric machine according to the first embodiment.

As shown in FIG. 3A, the bus bar 13 has a circular arc shape such as to follow the inner diameter of the coil ends 24 as seen from the top (in the axial direction). Also, as shown in FIG. 3B, the bus bar 13 is formed in a substantially U-shape as seen from the side and has two end portions 11. As shown in FIG. 4, the end portions 11 of the bus bar 13 are each electrically connected to the terminal wire 25 of the unit coil 12 by TIG welding, laser welding, or the like. The bus bar 13 connects two of the terminal wires 25, for example, six slots away from each other. The stator winding 10 is integrated by connecting the two terminal wires 25, for example, six slots away from each other, with the bus bar 13 and by connecting the terminal wires 25 together.

Figure 5A:
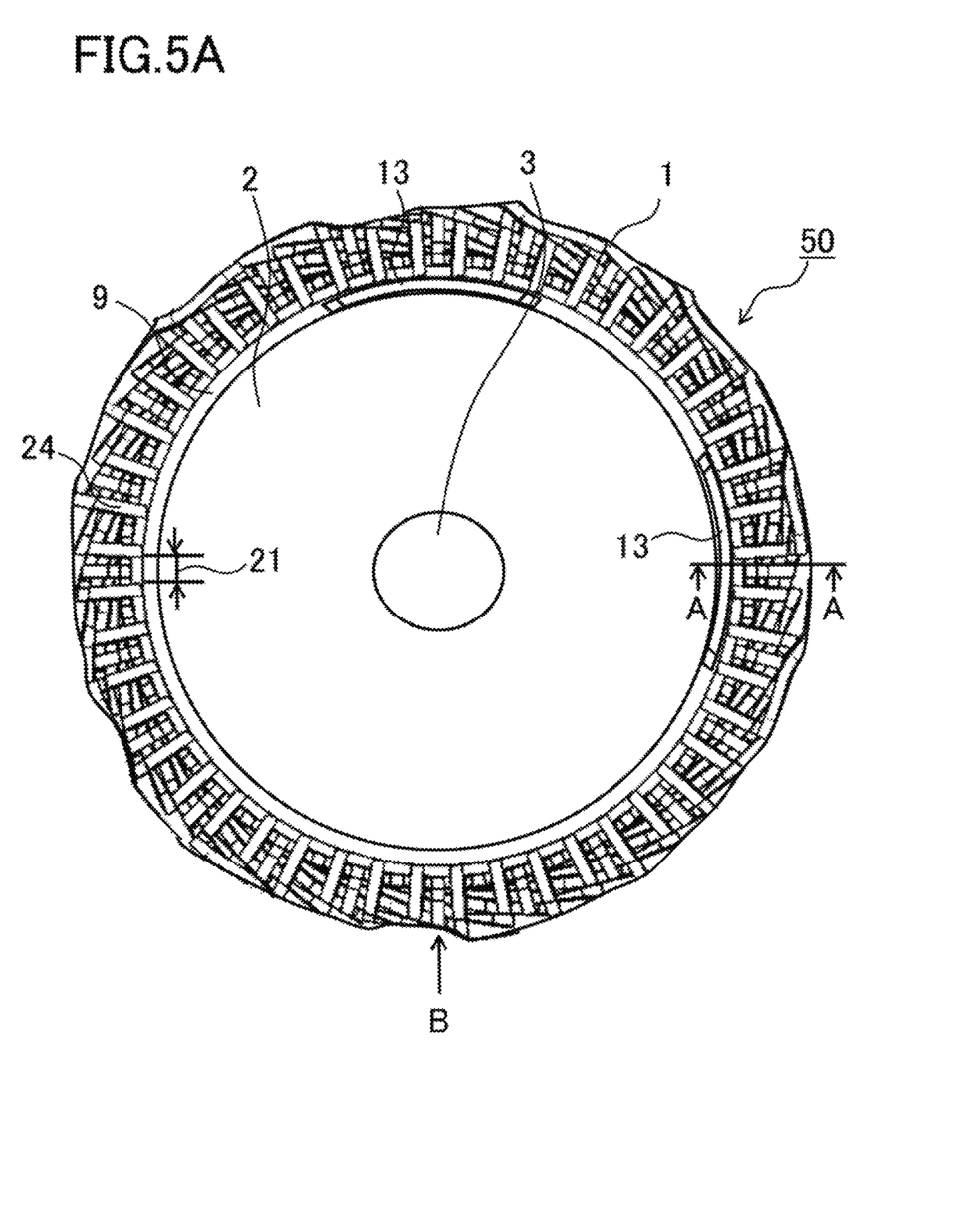
FIG. 5A is a top view of the rotary electric machine according to the first embodiment.
Figure 5B:
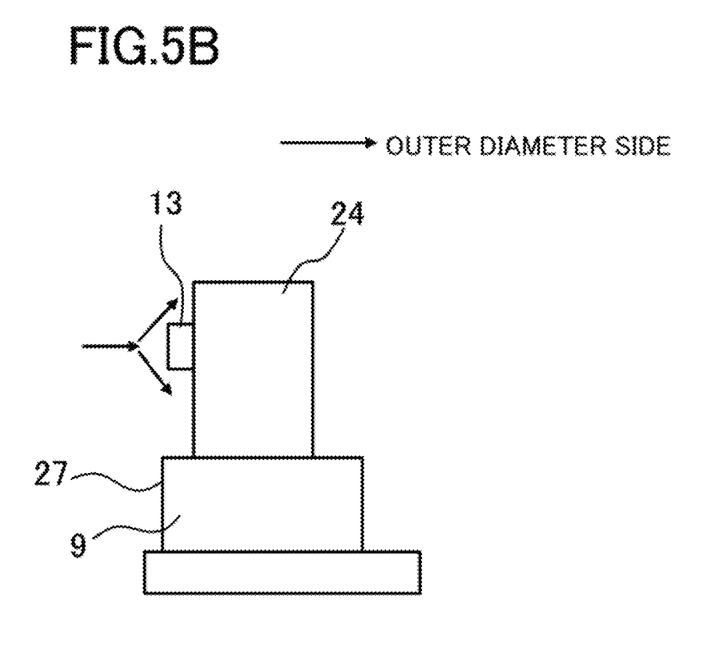
FIG. 5B is a sectional view along the line A-A of FIG. 5A.
Figure 5C:
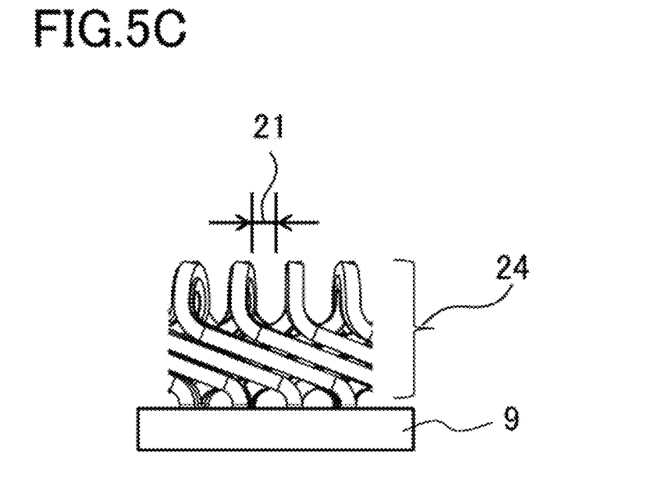
FIG. 5C is a side view as seen from the side B of FIG. 5A.
Figure 5D:
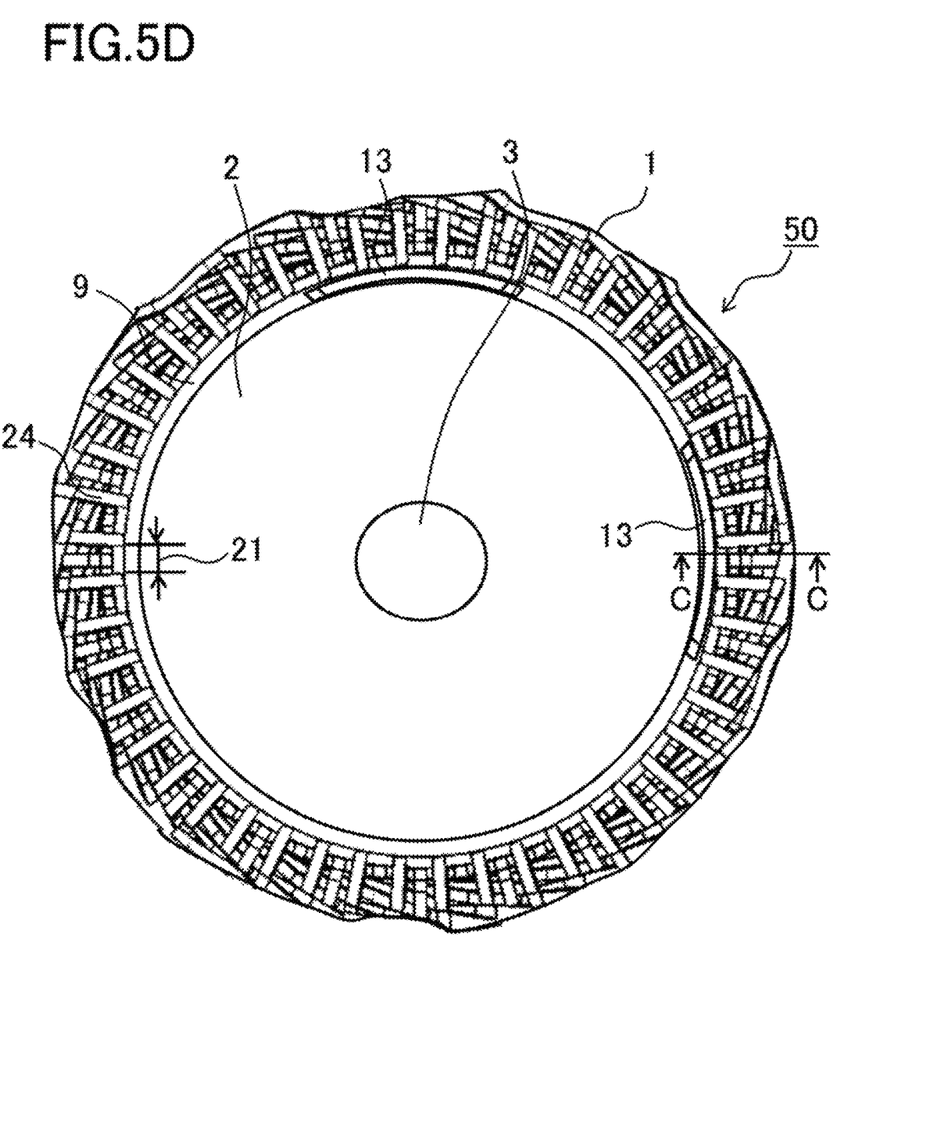
FIG. 5D is a top view showing a modification example of the rotary electric machine according to the first embodiment.
Figure 5E:
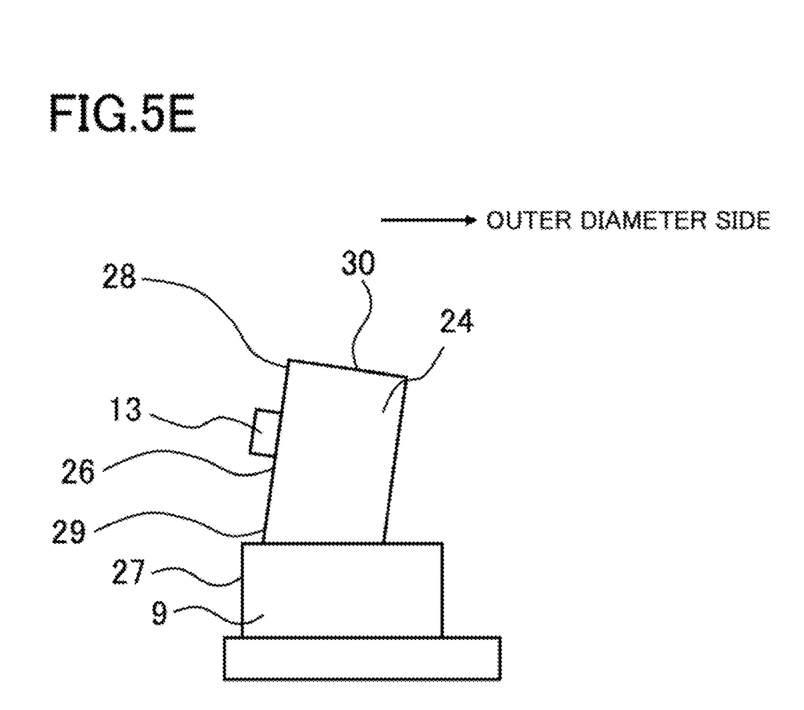
FIG. 5E is a sectional view along the line C-C of FIG. 5D.

FIG. 5A is a top view of the rotary electric machine according to the first embodiment. Also, FIG. 5B is a sectional view along the line A-A of FIG. 5A, and FIG. 5C is a side view as seen from the side B of FIG. 5A. Furthermore, FIG. 5D is a top view showing a modification example of the rotary electric machine according to the first embodiment, and FIG. 5E is a sectional view along the line C-C of FIG. 5D. FIGS. 5B, 5C, and 5E are illustrations focused on the coil end 24, wherein a rotor 2 and a rotary shaft 3 which are disposed inside the inner periphery of the stator 1 are omitted from illustration.

As shown in FIG. 5A, a rotary electric machine 50 includes the rotor 2, which has the rotatably supported rotary shaft 3, and the stator 1 disposed opposite the outer periphery of the rotor 2.

As shown in FIGS. 5A and 5C, the radial clearances 21 passing through from the inner diameter side to the outer diameter side are each provided between adjacent coil ends 24. The bus bar 13, being disposed on the inner diameter side of the stator 1, is disposed in a position in which it occludes the clearances 21 between the coil ends 24. With this configuration, a radially sprayed refrigerant is restrained from passing through the clearances 21 between the coil ends 24, and the refrigerant is guided to the coil ends 24 along the bus bar 13, so that the refrigerant comes into sufficient contact with the coil ends 24, leading to an improvement in cooling performance.

In FIG. 5B, the arrows shown pointing in the direction of the bus bar 13 indicate the direction in which the refrigerant is sprayed or the direction in which the refrigerant diffuses. As shown in FIG. 5B, when the refrigerant is strayed from the inner diameter side to the outer diameter side, the refrigerant is diffused by hitting against the bus bar 13, and the refrigerant can thus be brought into wide contact with the coil ends 24, enabling an improvement in cooling performance Also, the bus bar 13 guides the refrigerant, which is supplied from the radial direction of the stator 1, to the plurality of coil ends 24. The refrigerant is supplied from the inner diameter side of the stator 1, specifically, from, for example, the rotor 2 side.

FIG. 5D is a top view showing a modification example of the rotary electric machine according to the first embodiment, and FIG. 5E is a sectional view along the line C-C of FIG. 5D. In the region in which the bus bar 13 is disposed on the inner diameter side of the plurality of coil ends 24, the respective bases of the coil ends 24 protruding from the slots 22 of the stator core 9 cannot be changed in position. When the coil end 24 is erected normal to the stator core 9 as shown in FIG. 5B, there is also a possibility that the bus bar 13 may come out to the inner diameter side beyond an end face 27 of the stator core 9. Consequently, in the region in which the bus bar 13 is disposed, as shown in FIGS. 5D and 5E, the position of the coil ends 24 may be inclined to the outer diameter side.

Specifically, an inner diameter side face 26 of the coil end 24 has a first lateral face 28 on the side of a top portion 30 of the coil end 24 and a second lateral face 29 on the side of the end face 27 of the stator core 9, and the coil end 24 may be provided so that the first lateral face 28 is positioned farther in the outer diameter direction than the second lateral face 29, that is, is provided on the outer diameter side.

Owing to the above configuration, the coil ends 24 can be reduced in size, enabling an improvement in cooling performance without an increase in size.

Also, the bus bar 13 may be disposed closer in the axial direction to the stator core 9 side than to the top portion 30 of the coil end 24. The bus bar 13 is disposed closer in the axial direction to the stator core 9 side than to the top portion 30 of the coil end 24, thereby enabling the refrigerant to be guided among the coil ends 24, leading to an improvement in cooling performance.

Furthermore, the bus bar 13 may be disposed on the outer diameter side of the inner diameter surface of the stator 1. This configuration enables an improvement in cooling performance without an interference with the rotor 2.

Also, the bus bar 13, being rectangular in section, may be disposed so that the lateral face thereof crosses the radial direction of the stator 1. The bus bar 13 can receive the refrigerant on its surface, so that the amount of refrigerant supplied to the coil ends 24 increases, enabling a further improvement in cooling performance.

Also, the bus bar 13 is formed in a circular arc along the inner diameter of the coil ends 24. The bus bar 13 is formed in a circular arc along the inner diameter of the coil ends 24, thereby increasing the area of the coil ends 24 with which the refrigerant comes into contact, leading to an improvement in cooling performance.

Also, the surface of the bus bar 13 has thereon an insulating film. The distance required to insulate the bus bar 13 from the coil ends 24 can be reduced by using a member having an insulating film around the bus bar 13. That is, the bus bar 13 can be disposed adjacent to the coil ends 24, so that the refrigerant comes into sufficient contact with the coil ends 24, leading to an improvement in cooling performance.

Also, the stator winding 10 has a plurality of annular coils, and at least a pair of ones of the plurality of annular coils are connected together via the bus bar 13.

The refrigerant is sprayed from the inner diameter side toward the outer diameter side of the coil ends 24. The refrigerant is diffused by hitting against the bus bar 13, and comes into sufficient contact with the coil ends 24, leading to an improvement in cooling performance.

As above, according to the rotary electric machine 50 of the first embodiment, it is possible to obtain the rotary electric machine 50 wherein the refrigerant is guided to the coil ends 24 along the bus bar 13, so that the refrigerant comes into sufficient contact with the coil ends 24, leading to an improvement in the cooling performance for the coil ends 24.

Second Embodiment

Figure 6:
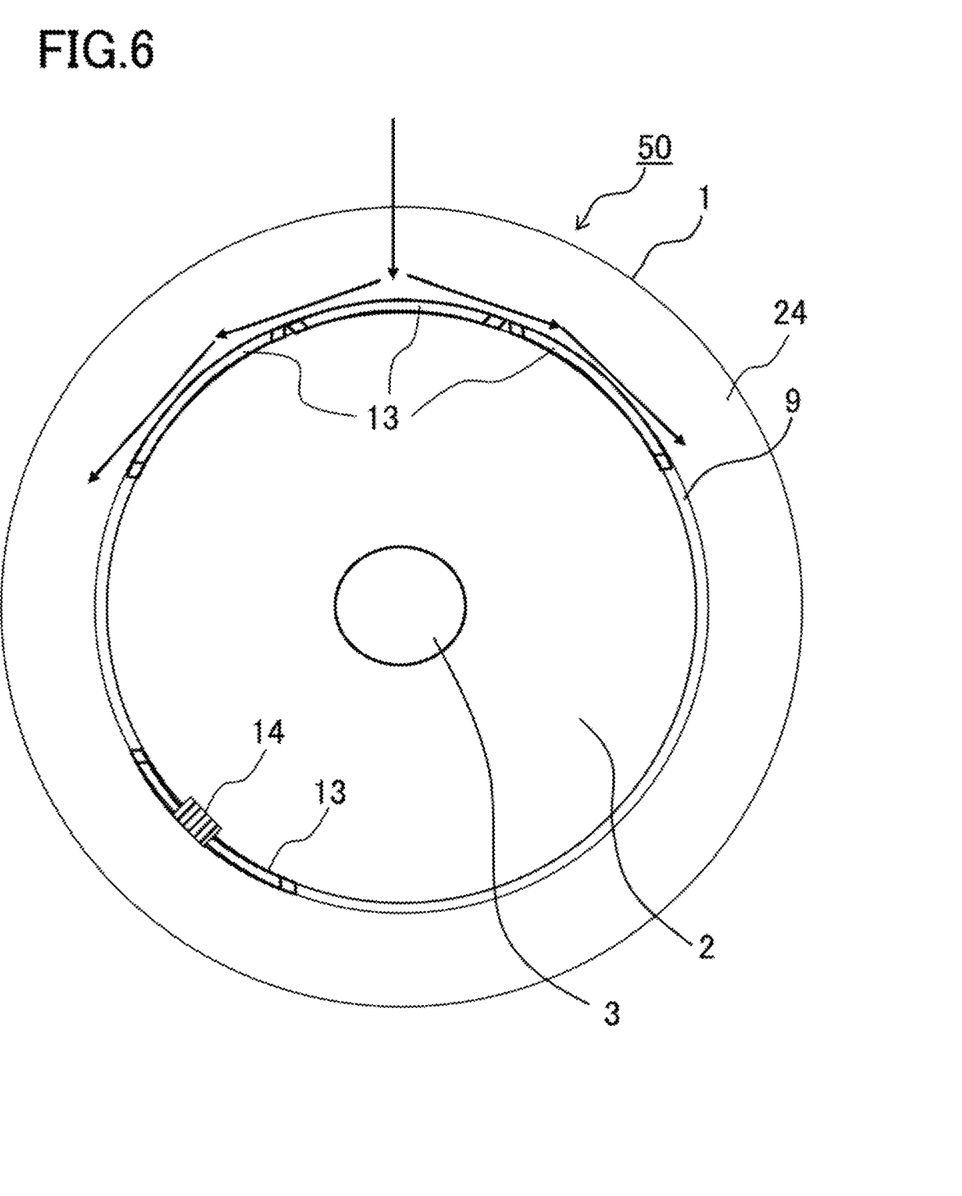
FIG. 6 is a front view showing a rotary electric machine according to the second embodiment.

FIG. 6 is a front view showing a rotary electric machine according to the second embodiment. In the second embodiment, a description will be given of only different points from those in the first embodiment, omitting the description of configurations identical to those in the first embodiment. Also, in FIG. 6, the arrows shown pointing in the direction of the bus bar 13 indicate the direction in which the refrigerant is sprayed or the direction in which the refrigerant flows.

As shown in FIG. 6, in the rotary electric machine 50 of the second embodiment, the stator 1 is installed so that the direction of the rotary shaft 3 of the rotor 2 is positioned in the horizontal direction. In the second embodiment, a refrigerant which is, for example, a cooling oil is sprayed from the outer diameter side toward the inner diameter side of the coil ends 24. The refrigerant is supplied, for example, from the side of a motor case (not shown) which holds the stator 1. According to the rotary electric machine 50 of the second embodiment, the refrigerant sprayed from above, as seen in the horizontal direction, drips down the bus bars 13 by gravity and comes into sufficient contact with the coil ends 24, thus leading to an improvement in cooling performance.

Also, a plurality of the bus bars 13 are disposed on the inner diameter side of the coil ends 24, and the plurality of bus bars 13 are disposed in a range of 90 degrees or more centered on the rotary shaft 3 of the rotor 2.

The plurality of bus bars 13 are provided and disposed in a range of 90 degrees or more centered on the rotary shaft 3 of the rotor 2, thereby enabling the refrigerant sprayed from above to trickle down the bus bars 13 and come into contact with the left and right coil ends 24, leading to an improvement in cooling performance.

Furthermore, a configuration may be such that the bus bar 13 is disposed below the rotary shaft 3, as seen in the horizontal direction, and that a temperature detector 14 is installed on the bus bar 13 disposed below as seen in the horizontal direction. In this case, the temperature detector 14 is installed on the lower side on which the refrigerant is unlikely sprayed, and thereby it is possible to measure the temperature of the bus bar 13 which, as the refrigerant is not sprayed thereon, is high in temperature.

The stator 1 has thereon the temperature detector 14, wherein at least one bus bar 13 is disposed below the rotary shaft 3, as seen in the horizontal direction, and at least one temperature detector 14 is installed on the bus bar 13 disposed below as seen in the horizontal direction.

Third Embodiment

Figure 7:
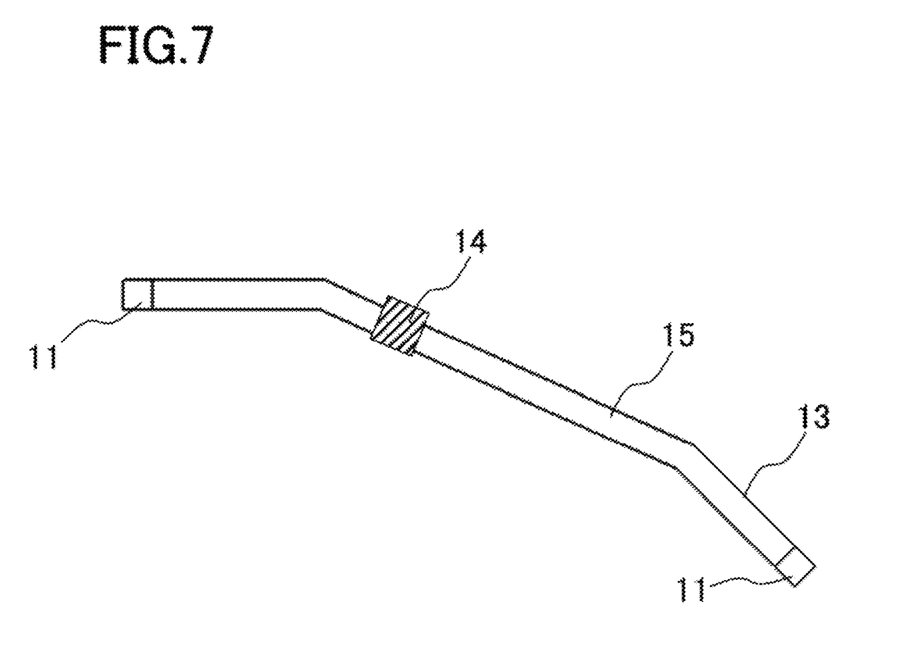
FIG. 7 is an enlarged top view showing a bus bar according to the third embodiment.

FIG. 7 is an enlarged top view showing a bus bar according to the third embodiment. In the third embodiment, a description will be given of only different points from those in the second embodiment. As shown in FIG. 7, the bus bar 13 has a straight portion 15, and the temperature detector 14 is installed on the straight portion 15. The temperature detector 14 is installed on the straight portion 15, so that it is easy to stabilize the state of contact between the temperature detector 14 and the bus bar 13, leading to an improvement in temperature detection accuracy.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A rotary electric machine, comprising:
a rotor; and
a stator which, being disposed opposite the rotor, has a stator core having a plurality of slots therein and a stator winding fixed in the plurality of slots, wherein
the stator has a plurality of coil ends which are formed protruding from an axial end face of the stator core and between adjacent ones of which is provided a radial clearance passing through from an inner diameter side to an outer diameter side, and wherein
the stator includes a bus bar which, being disposed on the inner diameter side of the plurality of coil ends so as to occlude the clearances between the plurality of coil ends, guides a refrigerant, which is supplied from a radial direction of the stator, to the plurality of coil ends, and
an inner diameter side face of each of the coil ends has a first lateral face on a top portion side of the coil end and a second lateral face on a stator core side of the coil end, and the coil end has the first lateral face positioned closer to the outer diameter side than the second lateral face.

2. The rotary electric machine according to claim 1, wherein
the bus bar is disposed closer in an axial direction to the stator core side than to top portions of the coil ends.

3. The rotary electric machine according to claim 2, wherein
the bus bar is disposed on the outer diameter side of an inner diameter side end face of the stator core.

4. The rotary electric machine according to claim 2, wherein
the bus bar, being rectangular in section, is disposed so that a lateral face thereof crosses the radial direction of the stator.

5. The rotary electric machine according to claim 2, wherein
the bus bar is formed in a circular arc along the inner diameter of the coil ends.

6. The rotary electric machine according to claim 2, wherein
a surface of the bus bar has thereon an insulating film.

7. The rotary electric machine according to claim 2, wherein
the stator winding has a plurality of annular coils, and at least a pair of ones of the plurality of annular coils are connected together via the bus bar.

8. The rotary electric machine according to claim 2, wherein
the refrigerant is sprayed from the inner diameter side toward the outer diameter side of the coil ends.

9. The rotary electric machine according to claim 2, wherein
a rotary shaft of the rotor is installed so that a direction of the rotary shaft is positioned in a horizontal direction, and
the refrigerant is sprayed from above as seen in the horizontal direction.

10. The rotary electric machine according to claim 1, wherein
the bus bar is disposed on the outer diameter side of an inner diameter side end face of the stator core.

11. The rotary electric machine according to claim 1, wherein
the bus bar, being rectangular in section, is disposed so that a lateral face thereof crosses the radial direction of the stator.

12. The rotary electric machine according to claim 1, wherein
the bus bar is formed in a circular arc along the inner diameter of the coil ends.

13. The rotary electric machine according to claim 1, wherein
a surface of the bus bar has thereon an insulating film.

14. The rotary electric machine according to claim 1, wherein
the stator winding has a plurality of annular coils, and at least a pair of ones of the plurality of annular coils are connected together via the bus bar.

15. The rotary electric machine according to claim 1, wherein
the refrigerant is sprayed from the inner diameter side toward the outer diameter side of the coil ends.

16. The rotary electric machine according to claim 1, wherein
a rotary shaft of the rotor is installed so that a direction of the rotary shaft is positioned in a horizontal direction, and
the refrigerant is sprayed from above as seen in the horizontal direction.

17. The rotary electric machine according to claim 16, wherein
a plurality of the bus bars including the bus bar, are disposed, and
the plurality of bus bars are disposed in a range of 90 degrees or more centered on the rotary shaft.

18. The rotary electric machine according to claim 17, wherein
the stator has thereon at least one temperature detector, and wherein
the bus bar is disposed below the rotary shaft, as seen in the horizontal direction, and the at least one temperature detector is installed on the bus bar disposed below as seen in the horizontal direction.

19. The rotary electric machine according to claim 18, wherein
the bus bar has a straight portion, and
the temperature detector is installed on the straight portion.

* * * * *